April 5, 1966  F. H. GREEN ET AL  3,244,498
GLASS MELTING FURNACE WITH BRIDGE WALL
Filed July 6, 1962  3 Sheets-Sheet 1
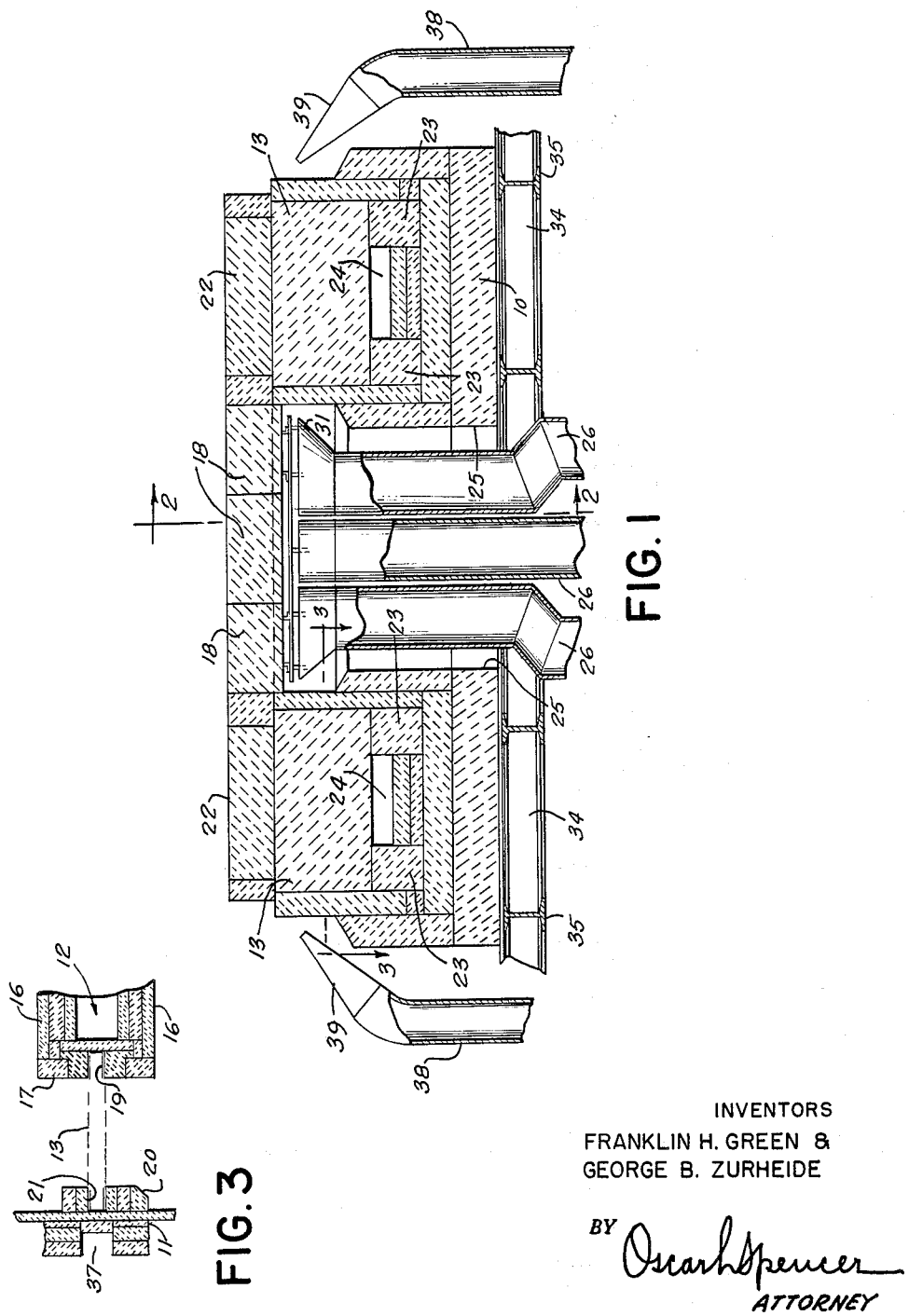
INVENTORS
FRANKLIN H. GREEN &
GEORGE B. ZURHEIDE
BY *Oscar H. Spencer*
ATTORNEY April 5, 1966  F. H. GREEN ET AL  3,244,498
GLASS MELTING FURNACE WITH BRIDGE WALL
Filed July 6, 1962  3 Sheets-Sheet 2
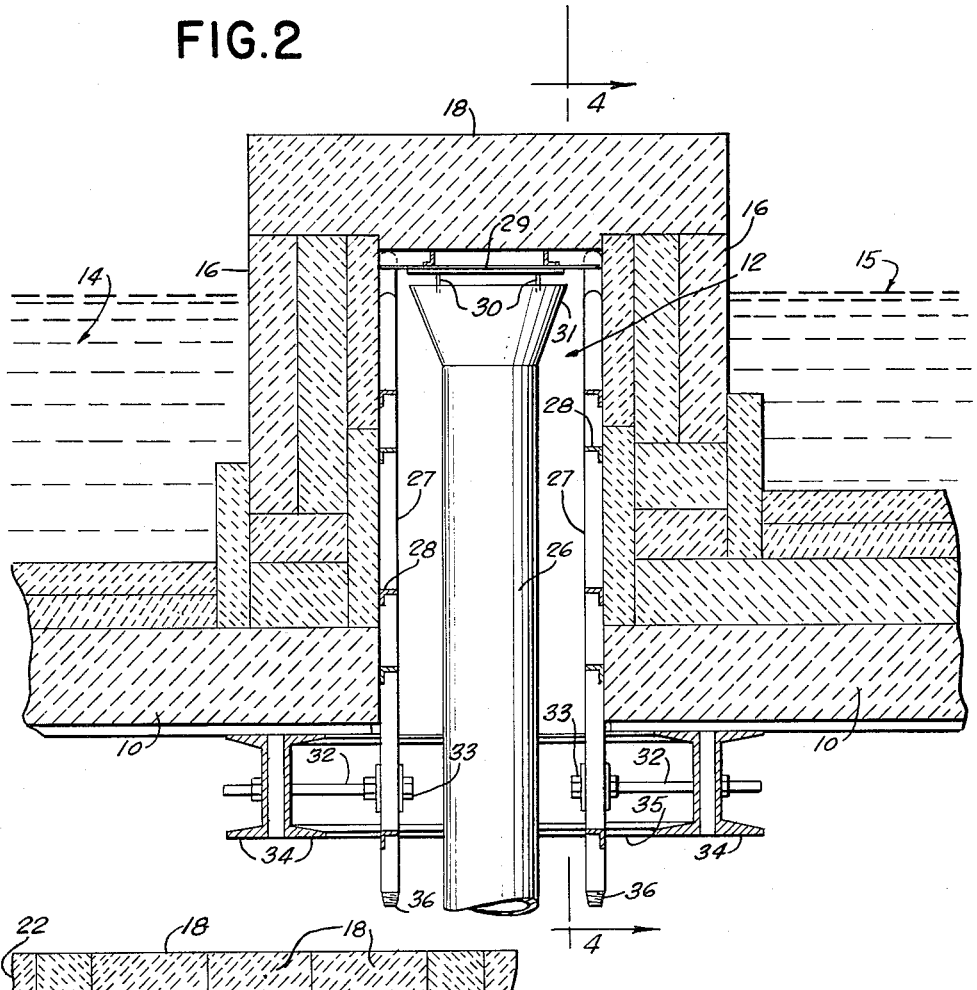
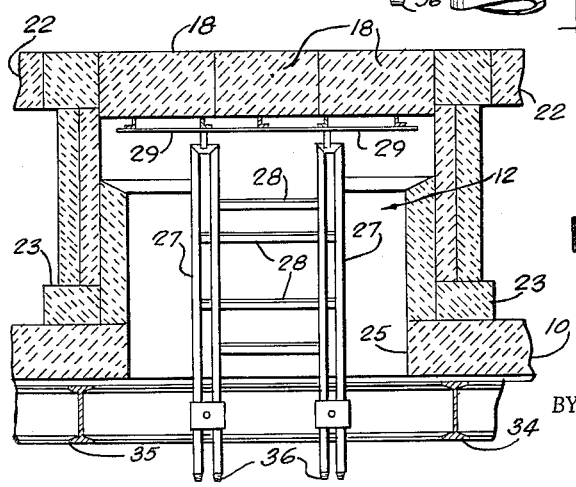
INVENTORS
FRANKLIN H. GREEN &
GEORGE B. ZURHEIDE
BY Oscar L. Spencer
ATTORNEY

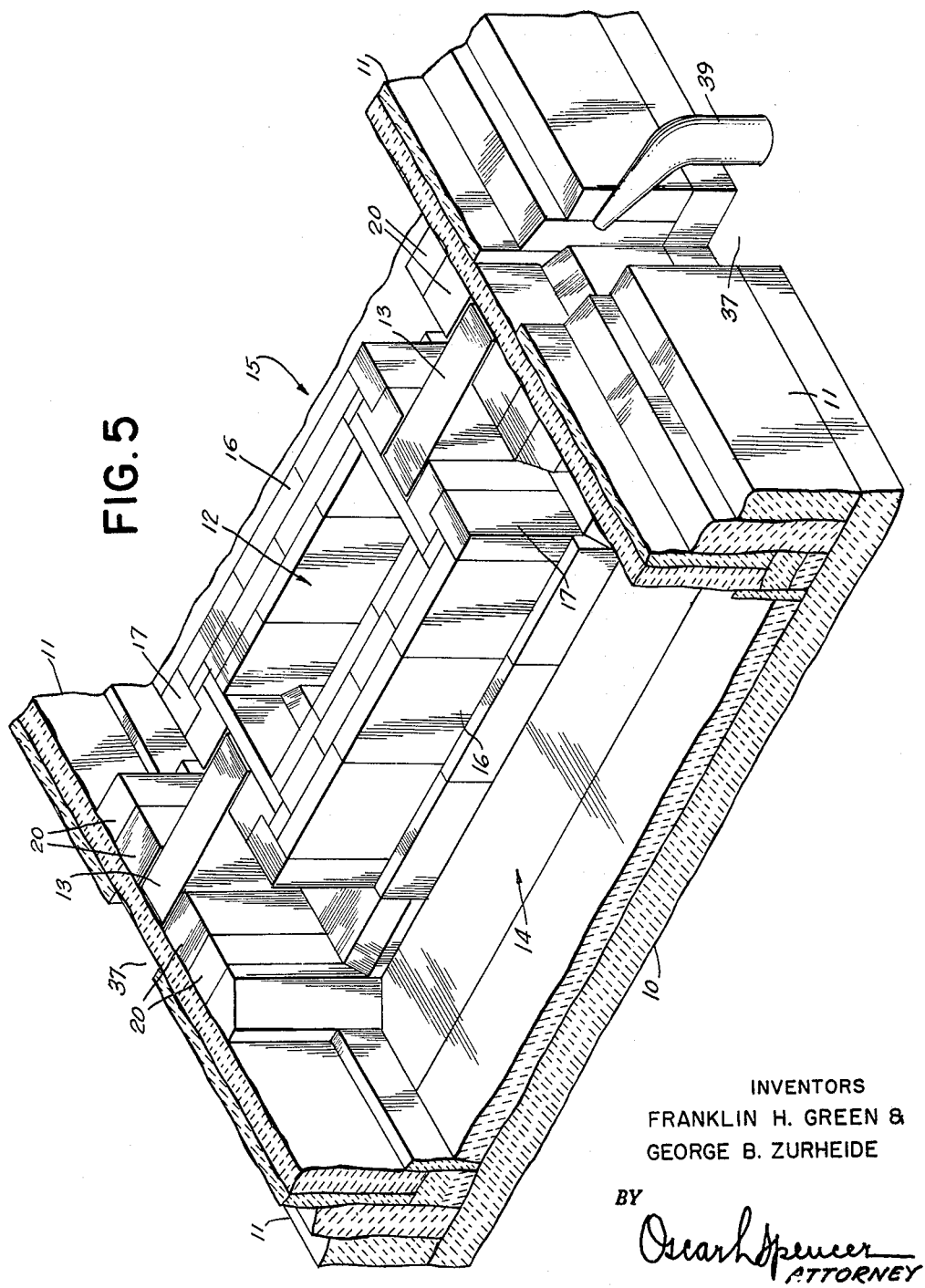
INVENTORS
FRANKLIN H. GREEN &
GEORGE B. ZURHEIDE

United States Patent Office 3,244,498
Patented Apr. 5, 1966

3,244,498
GLASS MELTING FURNACE WITH BRIDGE WALL
Franklin H. Green, Shelbyville, Ind., and George B. Zurheide, Pittsburgh, Pa., assignors to Pittsburgh Plate Glass Company, Pittsburgh, Pa., a corporation of Pennsylvania
Filed July 6, 1962, Ser. No. 208,025
3 Claims. (Cl. 65—347)

This invention relates to a glass melting tank having a melting zone and a refining zone and more particularly to a bridge wall in the tank for separating these zones.

The glass melting tank which contains the novel bridge wall of this invention is used in a furnace for the continuous production of molten glass. The melting tank, which is generally a long and narrow structure, constantly receives batch materials at one of its ends and constantly discharges finished glass at its other end. The batch materials may be introduced through openings at one end of the tank or in the side walls near that end where they enter what is known as the melting zone of the tank. These materials are melted and refined to some extent as they advance through this melting zone before they pass to a refining zone where they are further refined and conditioned before discharged from the tank. A transversely disposed bridge wall is provided in the tank for separating the melting and refining zones.

In the past bridge walls have been merely formed by a single wall extending across the width of the tank from one side to the other and having a number of submerged ports through which the molten glass is allowed to pass as it flows from the melting zone to the refining zone. A bridge wall constructed in this manner has proved to be a weak point as far as the furnace life is concerned as it has been the first section of the furnace to deteriorate. This deterioration has been evidenced by holes eaten through joints of the various refractory blocks making up the wall. One theory advanced to explain this failure of the bridge wall has pointed out the fact that the bridge wall is exposed on both of its sides to the molten glass and hot gases thereby causing it to fail sooner than the other walls of the furnace which are exposed on only one side to these high temperature conditions.

Accordingly, it is a principal object of this invention to provide an improved bridge wall having the major portion thereof exposed on only one of its sides to the molten glass and hot gases.

It is a further object of this invention to provide an improved bridge wall adapted to be effectively cooled by a cooling medium.

It is another object of this invention to provide a bridge wall having a hollow center section adapted to have the interior thereof cooled by a cooling system.

It is a still further object of this invention to provide a bridge wall having a hollow center section and a single skim block at each end thereof and having means for cooling the skim blocks.

It is a further object of this invention to provide a bridge wall having a pair of skim blocks adapted to be removably held in place in vertically extending grooves.

It is an even further object of this invention to provide effective cooling means for cooling the bridge wall.

It is a still further object of this invention to provide a durable bridge wall which will require infrequent repair and which will be easy to repair whenever such repair is necessary. These and other objects and advantages of the invention will become apparent from the following specification wherein like numerals refer to similar parts throughout.

In the drawings:

FIG. 1 is a transverse section of a melting tank taken at a station along the length of the same through the center of the bridge wall;

FIG. 2 is a section taken along line 2—2 of FIG. 1;

FIG. 3 is a section taken along line 3—3 of FIG. 1 showing the skim blocks in phantom lines;

FIG. 4 is a section taken along line 4—4 of FIG. 2; and

FIG. 5 is a fragmentary perspective of the lower portion of a melting tank showing the bridge wall with its cover blocks and duct work removed.

Generally, the novel bridge wall of this invention, which is transversely disposed in the lower portion of a glass melting tank, includes a hollow center section and a throat portion at each end thereof comprising a single removable skim block. The hollow center section is generally rectangular in shape, and it includes vertical walls and a cover which is formed of cover blocks. This center section is open at its bottom and communicates with an opening in the bottom of the tank for receiving one or more conduits which extend up into the hollow center section. A cooling medium, such as cooled air, is forced through these conduits where it spills over into the inside of the hollow center section for cooling of the same. The skim blocks extend from the ends of the hollow center section to the sides of the glass melting tank, and they are spaced apart some distance from the floor of the tank for forming a pair of ports to permit the molten glass to flow from the melting zone of the tank to the refining zone. These skim blocks are adapted to slide in vertical grooves formed by the refractory blocks which make up the hollow center section and the tank walls. Upon shut down of the furnace, the skim blocks may be replaced by lifting them from the vertical grooves. The side walls of the glass melting tank have a reduced thickness at the point where they are abutted by the skim blocks, and means are provided to direct a cooling medium on the outside walls of the tank at these points. In this way the skim blocks, which are subjected to more wear than any other part of the bridge wall, are cooled to some extent. They are in contact with the cooled center section at one of their ends, and they are in contact at their other end with the side walls of the glass melting tank at a point therealong which is contacted by a cooling medium.

Referring to the drawings and more particularly to FIG. 5, a fragmentary portion of a melting tank is shown and it includes a floor 10 and sides 11. At this point is might be stated that the melting tank as well as the bridge wall is made of suitable refractory material. It will be noted that the floor and walls of the tank are formed by a number of layers of this material. Actually, the melting tank is a long and relatively narrow structure completely enclosed by a roof and its side walls which extend approximately twice the height shown in FIG. 5. The bridge wall includes a hollow center section, generally designated 12, and a throat portion at each end thereof which comprises a skim block 13. The bridge wall defines on one of its sides a melting zone, generally designated 14, and on its other side a refining zone, generally designated 15.

Referring to all of the figures, the hollow center section 12 will be seen to include side walls 16 and end walls 17. A number of cover blocks 18 are provided to cover and enclose the top of the hollow center section. Reference to FIG. 3 will show that the end walls 17 of the hollow center section are formed from refractory blocks to provide a vertically extending groove 19 therein for reception of one end of the skim block 13. A number of vertically disposed blocks 20 are secured to the inside of the side wall 11 of the melting tank to provide a vertically disposed groove 21. This groove 21 confronts the groove 19 and receives the other end of the skim block 13. Cover blocks 22, similar to the cover blocks 18, rest on top of the skim blocks 13. Looking particularly to FIG. 1, the skim blocks 13 will be seen to rest upon blocks 23 which are in turn supported by the floor 10 of the furnace for forming a pair of ports 24 which allow the molten glass to pass from the melting zone of the tank to the refining zone thereof. It will be understood that the vertically disposed grooves 19 and 21 are of a size sufficient to permit vertical sliding movement of the skim blocks 13. Accordingly, to remove one of the skim blocks for repair or replacement it is only necessary to remove a shadow wall and the cover block 22 and lift the skim block 13 from the grooves 19 and 21.

The hollow center section 12 is open at its bottom where it communicates with an opening 25 in the floor 10 of the glass melting furnace. A number of conduits adapted to have a cooling medium forced therethrough are suspended from a metal framework which is attached to the inside of the walls of the hollow center section. In the drawings three separate conduits 26 are shown extending into the hollow center section. Of course it will be realized that a single conduit or any desired number of conduits could be provided for directing the flow of cooling medium to the inside of this portion of the bridge wall.

Referring particularly to FIG. 4, it will be noted that a pair of U-shaped pipe members 27 are clamped against the inside of each of the side walls 16 of the hollow center section 12. The pipe members 27, which are held in their spaced-apart relation by a number of braces 28, support a horizontally disposed rectangular framework 29 just beneath the cover blocks 18. Each conduit 26 is suspended from the framework 29 by a number of small metal straps 30 which extend between the framework 29 and the outwardly flared portion 31 of the conduit 26. The U-shaped pipe members 27 are held in contact with the inside of the walls 16 by rods 32 and nuts 33. The rods 32 are attached to channel members 34 which are part of the structural framework supporting the floor of the melting tank. I-beam or wide flange members 35 extend at right angles to the channel members 34 to complete the structural framework supporting this part of the furnace. It will be noted that a threaded portion 36 is provided at each end of the U-shaped members 27 for attachment of additional pipe members to connect the pipes 27 with a flow of cooling water. It has been found desirable to circulate cooling water through the pipes 27 since they have a tendency to become very hot due to their direct contact with the refractory material which forms the bridge wall. Of course these pipes are also cooled by the flow of air which is used to cool the inside of the hollow center section 12.

It has been found that the bridge wall of this invention may be further cooled by directing a cooling medium at each side of the glass melting tank at the location of the bridge wall. As noted in FIG. 5, a vertically extending recess or notch 37 is provided in each side wall 11 at a location therealong where it is abutted by the skim block 13. The recess 37 is formed by cutting away one or more of the layers of refractory material which form the side walls 11 of the glass melting tank. It is true that this weakens the sidewalls to some extent, but this is compensated in a large degree by provision of the elongated blocks 20 which receive and support the outer end of the skim block 13. A conduit 38 is provided at each side wall 11 of the glass melting tank and a nozzle 39 is secured to the upper end of the conduit 38 for directing a cooling medium at the recess 37. The flow of cooling medium from the nozzle 39 cools the side wall 11 at its point of reduced thickness which is in contact with the outer end of the skim block 13. This feature considerably aids in cooling the skim blocks.

The conduits 26 and 38 are preferably secured to a single conduit which extends beneath the structural framework supporting the floor 10 of the glass melting tank. The cooling medium forced through the conduit is preferably air which may or may not be cooled.

It should be noted that a horizontal cross-section taken through the flared portions 31 of the conduits 26 is just slightly smaller than the horizontal cross-section of the hollow center section 12. Also, it will be noted that the outlets of the vertically disposed conduits 26 are disposed just slightly below the underside of the cover blocks 18. This arrangement of the conduits will force the cooling medium into intimate contact with the inside of the vertical walls making up the hollow center section 12 for better cooling of this section. The cooling medium will be maintained in close contact with the insides of the walls of the center section 12 as it is discharged through the narrow space between the inside of the center section and the outside of the conduits. This construction has proved very effective in cooling the hollow center section 12.

Thus, it will be seen by this invention that an improved bridge wall has been provided for separating the melting zone and refining zone in a glass melting tank. A major portion of the transversely disposed bridge wall is hollow allowing this portion to be cooled on one side thereof by a cooling medium. Effective means have been provided for forcing a flow of cooling medium into intimate contact with the inside of the walls making up the hollow center section. The remaining throat portions of the bridge wall comprise a pair of skim blocks which extend one on each end of the hollow center section to the side walls of the glass melting tank.

Each skim block 13 is cooled to the maximum extent possible as one of its ends is in contact with the cooled end wall of the hollow center section and its other end is in contact with the side wall 11 at its point of reduced thickness which is subjected to a flow of cooling medium from the nozzle mounted alongside of the glass melting tank. The skim blocks 13, which are subjected to more wear than any other part of the bridge wall since they are in contact at both of their sides with the hot gases, may be replaced or repaired by lifting them from the bridge wall upon shut down of the furnace. This is accomplished by means of the vertically extending grooves 19 and 21 which receive the ends of the blocks.

While this invention has been shown in but one form, it is obvious to those skilled in the art that it is not so limited but is susceptible of various changes and modifications without departing from the spirit and scope of the appended claims. For example, the bridge wall may be constructed with one throat or more than two throats without departing from the spirit of the invention. Also, it could be constructed with two hollow center sections and one or more throats. The skim block construction and the cooling of the bridge wall would be similar or identical.

We claim:
1. In a glass melting tank having a melting zone and a refining zone, a transversely disposed bridge wall separating said zones, said bridge wall comprising a hollow center section and a throat portion at each end thereof, each of said throat portions comprising a single vertically disposed skim block extending from said center section to the side wall of said tank, each of said skim blocks being vertically slidable in a pair of mutually confronting grooves formed in the end of said center section and the side wall of said tank, respectively, said skim blocks being easily replaced, and means spacing said skim blocks above the floor of said tank for forming a pair of ports communicating said melting zone with said refining zone.

2. In a glass melting tank having a melting zone and a refining zone a transversely disposed bridge wall separating said zones, said bridge wall comprising a hollow center section and a throat portion at each end thereof, said center section having vertical walls and a cover and being open at its bottom for the reception of a cooling medium, means to supply a cooling medium to the inside surfaces of the vertical walls of the center section, each of said throat portions comprising a single vertically disposed skim block extending from said center section to the side wall of said tank, each of said skim blocks being vertically slidable in a pair of mutually confronting grooves formed in the end of said center section and the side wall of said tank, respectively, and means spacing said skim blocks above the floor of said tank for forming a pair of ports communicating said melting zone with said refining zone.

3. A glass melting tank as recited in claim 2, wherein each side wall of said tank has a recess formed in its outside surface at the location of said bridge wall and means for directing a cooling medium at each recess formed in said side walls.

References Cited by the Examiner

UNITED STATES PATENTS

| | | | |
|---|---|---|---|
| 1,581,338 | 4/1926 | Ferngren | 65—135 |
| 1,661,836 | 3/1928 | Kutchka | 65—356 |
| 1,679,295 | 7/1928 | Dodge | 65—356 |
| 2,077,705 | 4/1937 | McKelvey et al. | 65—355 |
| 2,203,288 | 6/1940 | Willets | 263—44 |

DONALL H. SYLVESTER, *Primary Examiner.*

MORRIS O. WOLK, *Examiner.*